Aug. 20, 1929. D. SCHAEFFER Re. 17,414

RIDING TOY

Original Filed July 2, 1926 4 Sheets-Sheet 1

Dorman Schaeffer Inventor

By Frank M. Slough.

Attorney

Aug. 20, 1929. D. SCHAEFFER Re. 17,414

RIDING TOY

Original Filed July 2, 1926 4 Sheets-Sheet 2

Inventor

Dorman Schaeffer

By Frank M. Slough

Attorney

Aug. 20, 1929. D. SCHAEFFER Re. 17,414
RIDING TOY
Original Filed July 2, 1926 4 Sheets-Sheet 3
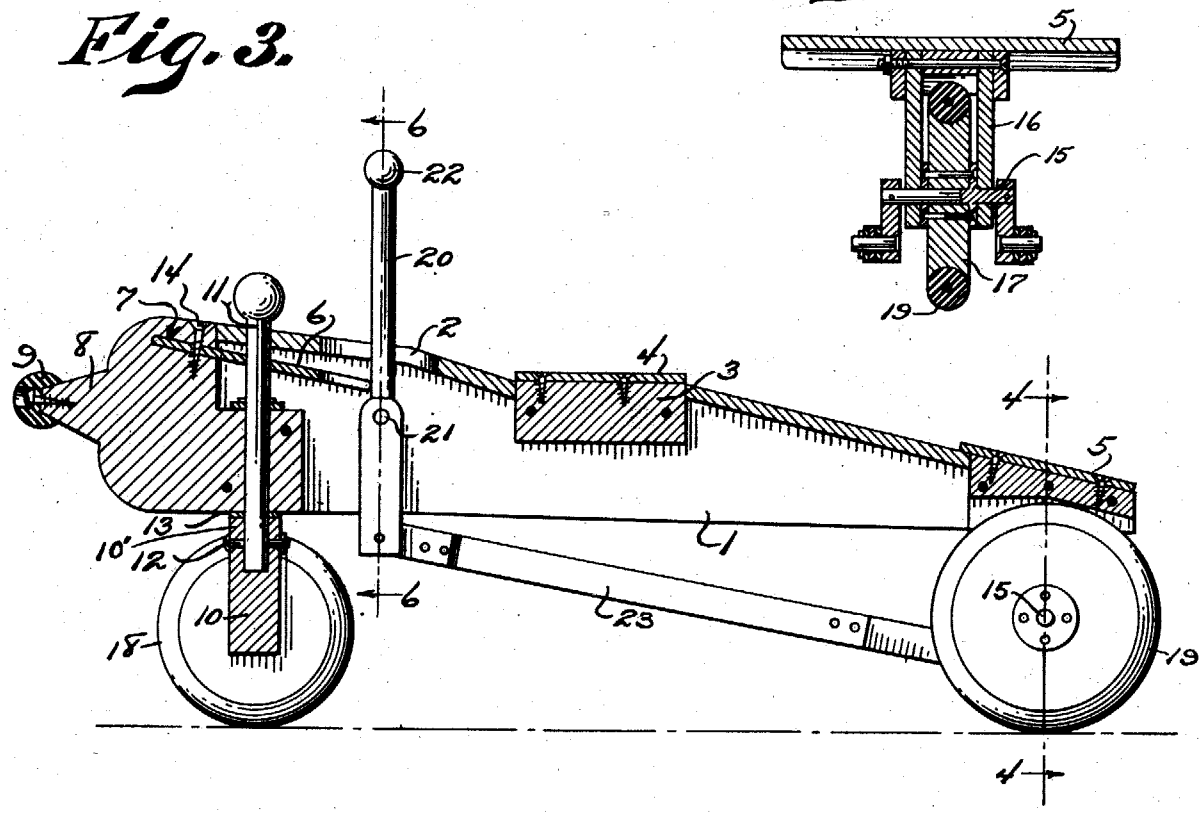
Inventor
Hermann Schaeffer
By Frank M. Slough
Attorney Aug. 20, 1929. D. SCHAEFFER Re. 17,414

RIDING TOY

Original Filed July 2, 1926 4 Sheets-Sheet 4

Inventor

Dorman Schaeffer

By Frank M. Slough

Attorney

Reissued Aug. 20, 1929.

Re. 17,414

UNITED STATES PATENT OFFICE.

DORMAN SCHAEFFER, OF HELENA, MONTANA.

RIDING TOY.

Original No. 1,624,627, dated April 12, 1927, Serial No. 120,146, filed July 2, 1926. Application for reissue filed May 28, 1928. Serial No. 281,296.

This invention relates to a wheeled toy, the general object of the invention being to provide means whereby a child sitting upon the toy can steer the same with his feet, while propelling the toy with his hands, through means of a rockable handle bar, a link and a crank shaft which carries a rear wheel.

Another object of the invention is to arrange the steering parts so that the device is not liable to tilt or fall over in making turns.

A still further object of the invention is to make the device somewhat in the shape of an airplane, the tail piece of which acts as an additional seat and the front wing of which is recessed to prevent the wing from interfering with the steering of the device by the feet of the child.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is a section on line 3—3 of Figure 2.

Fig. 4 is a section on line 4—4 of Figure 3.

Figure 1:
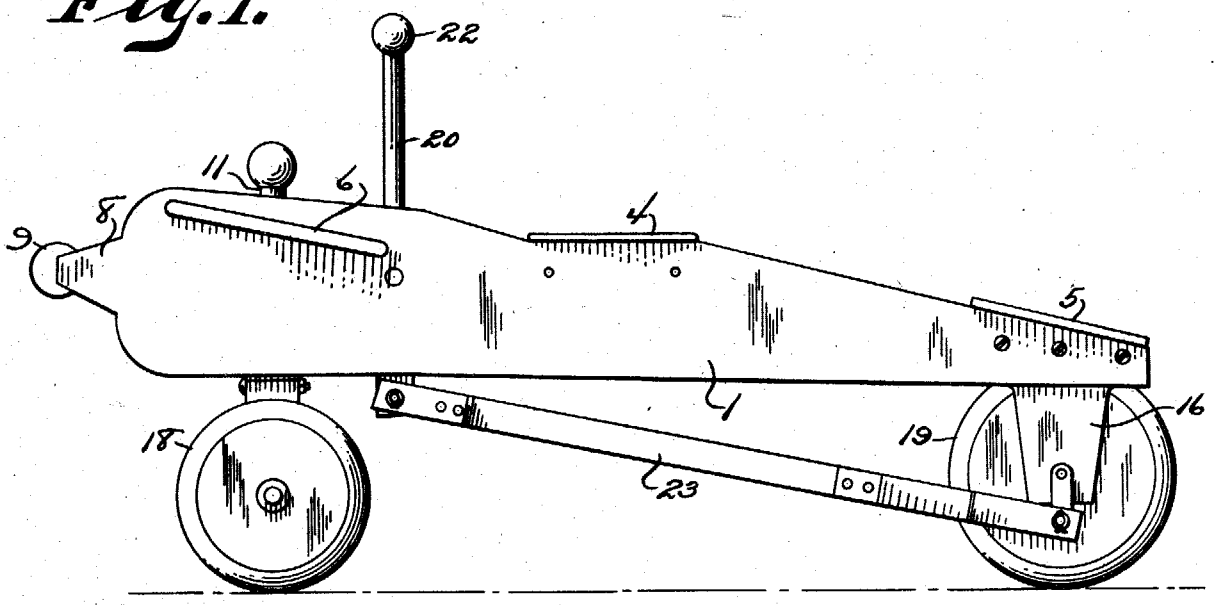
Fig. 1 is an elevation of the toy.
Figure 2:
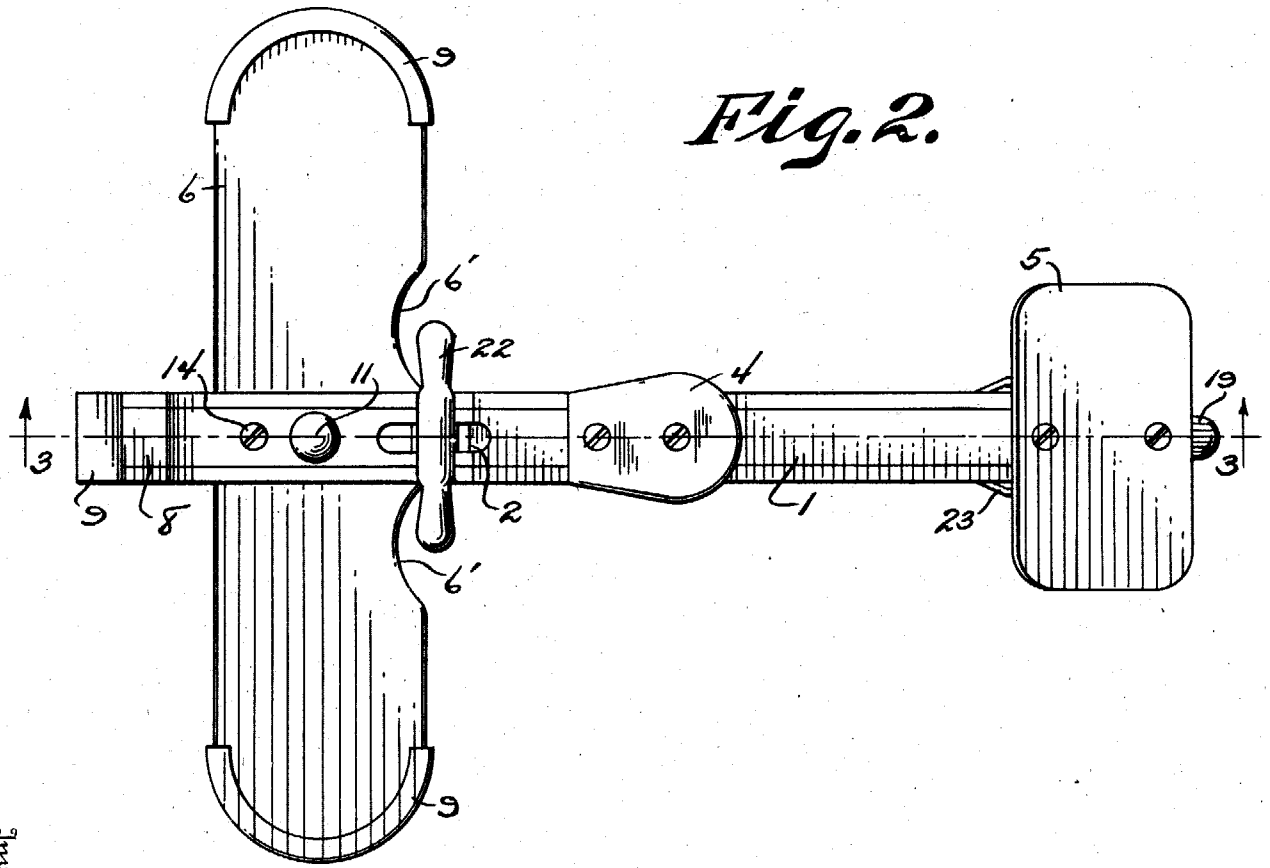
Fig. 2 is a plan view thereof.
Figure 5:
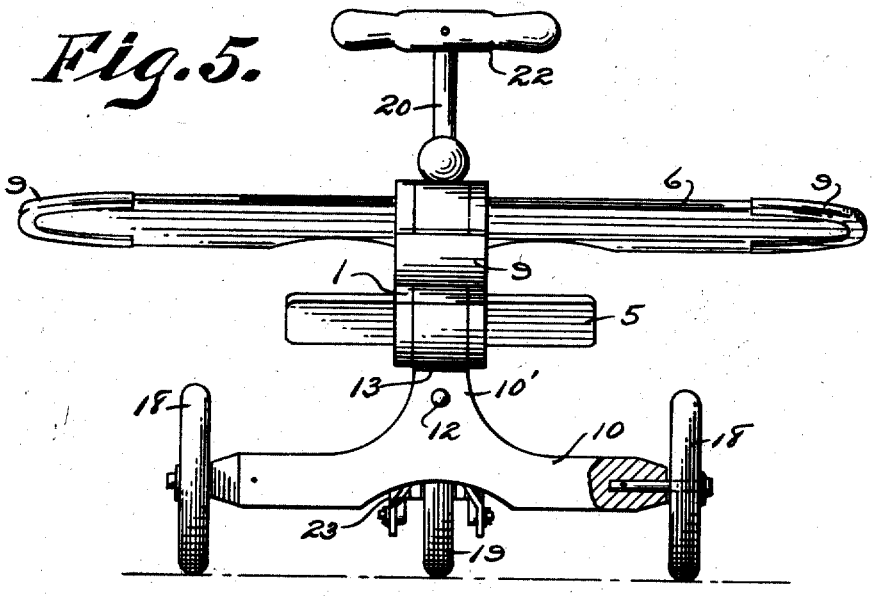
Fig. 5 is a front view.
Figure 6:
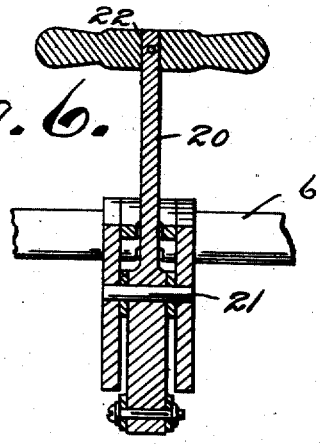
Fig. 6 is a section on line 6—6 of Figure 3.
Figure 7:
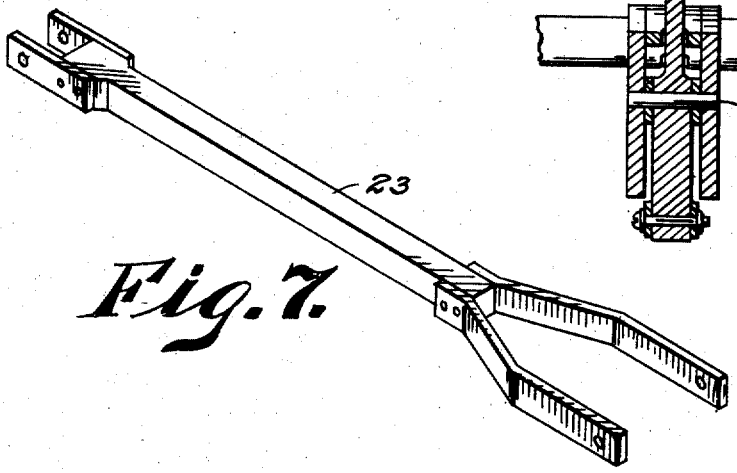
Fig. 7 is a perspective view of the forked link for connecting the handle bar with the crank shaft.

In these views, 1 indicates the body of the device which is of elongated form and has a straight lower edge and an upper edge which slopes from the front to the rear. The body has but little horizontal width so that it can be easily straddled by a child. The body is of most part hollow, with its top closed with the exception of an opening 2 and a block 3 is horizontally arranged in the upper part of the body intermediate the ends, said block having a seat 4 fastened thereto, the side edges of which diverge rearwardly, the front part of the seat being substantially the same width as the body so that a child sitting on the seat can straddle the body without difficulty. A tail piece 5 is fastened to the rear end of the body and this piece forms an extra seat. A wing forming strip 6 is passed through a rearwardly sloping slot 7 formed in the forward part of the body and this wing and the tail piece, together with the shape of the body, gives the device the appearance of an airplane. A projection 8 is formed on the front end of the body and this projection and the ends of the wings are tipped with rubber or other resilient material, as shown at 9.

The front axle 10 has an upwardly extending central portion 10′ which has a horizontal bearing against the lower edge of the body and a king bolt 11 passes through the body and engages a socket in said part 10′. A bolt or pin 12 fastens the king bolt in the socket and a washer 13 is placed between the body and axle. The bolt passes through the wing 6 and helps the screw 14 to hold the wing in position. The wing is provided with the recesses 6′, one at each side of the body to enable a child sitting on the seat to place his feet on the axle to steer the device.

A cranked rear shaft 15 is journaled in the depending pieces 16 which are fastened to the tail end of the body and this shaft carries the rear wheel 17. This wheel 17 and the front wheels 18 may be provided with rubber tires, as shown at 19. A handle bar 20 is pivoted to the body by the pin 21, and this bar passes through the opening 2 and has a handle 22 at its upper end. Its lower end projects from the body and a forked link 23 has its small fork pivoted to this lower end. The large fork of the link has its prongs pivoted to the cranks of the shaft 15.

From the foregoing, it will be seen that a child, occupying the seat 4, can, by placing his feet upon the front axle, move the same to steer the device, and by rocking the bar 20 with his hands to rotate the crank shaft through means of the link 23, the child can propel himself along a surface. The vertical arrangement of the king bolt and the horizontal bearing between the front axle and the body tends to prevent tilting or overturning of the device in making turns. The recessed wing and the narrow body and seat give free movement to the legs of the child in steering the device and the tail piece provides an extra seat. This tail piece and the wing, with the shape of the body, gives the device the appearance of an airplane, which makes the toy more appealing to the child. The device is very durable and can be manufactured to sell at low cost. The rear wheel is larger than the front wheels, thus giving a higher gearing. The device can be easily taken apart for shipment or storage.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A wheeled toy of the class described comprising a body, a horizontally arranged seat thereon, a tail piece at the rear of the body forming a second seat, a front axle movably connected with the body, front wheels carried thereby, said axle being moved by the feet of a child sitting on the seat, a crank shaft at the rear of the body, a wheel carried thereby, a handle bar in front of the seat and pivotally connected with the body, a link connecting the handle bar with the crank shaft, a wing forming strip passing through the body, a projection at the front end of the body and resilient material on the ends of the wing and on the projection.

2. A wheeled toy comprising an elongated body, a front axle movably connected with the body, a member for connecting the axle with the body, a wing forming strip passing through the forward portion of the body and through which said member passes, wheels carried by the front axle, a rear axle carried by the body, a single wheel carried thereby, a horizontally arranged seat on the body disposed approximately midway between the front and rear wheels, a handle bar extending vertically of the body and pivoted thereto in front of the seat so that it can be rocked by a child sitting on the seat and means for rotating the rear axle by reciprocatory movement of the handle bar.

3. A wheeled toy vehicle of the class described comprising an elongated body, a horizontally arranged seat thereon adapted to be straddled by the rider, a front axle pivotally connected with the body, a pair of front wheels carried thereby, said axle being turned by the feet of a child rider while seated on the seat, a single wheel supporting the rear of the body, said seat disposed approximately midway between the front wheels and the rear wheel, a handle bar in front of the seat and pivotally connected with and projecting upwardly of the body, means to effect driving of said rear wheel by oscillatory movement of the handle bar by the rider while seated upon the seat, a strip extending from each side of the forward portion of the body in simulation of an airplane wing, and a second seat at the rear of the body simulating in form an airplane tail piece.

4. A wheeled toy vehicle of the class described comprising an elongated body, a horizontally arranged seat thereon adapted to be straddled by the rider, a front axle pivotally connected with the body, a pair of front wheels carried thereby, said axle being turned by the feet of a child rider while seated on the seat, a single wheel supporting the rear of the body disposed approximately midway between the front and rear wheels, a handle bar in front of the seat and pivotally connected with and projecting upwardly of the body, means to effect driving of said rear wheel by oscillatory movement of the handle bar by the rider while seated on the seat, a strip extending from each side of the forward portion of the body in simulation of an airplane wing, and a second seat at the rear of the body simulating in form an airplane tail piece, said airplane wing strips being arcuately notched at their rear sides, in other portions adjacent the body to provide clearance for the legs of the rider during swivelling operation of the axle.

5. A wheeled toy vehicle of the class described comprising an elongated body, a horizontally arranged seat thereon adapted to be straddled by the rider, said seat disposed substantially midway of the ends of the body, a front axle pivotally connected with the body, a pair of front wheels carried thereby, said axle being turned by the feet of a child rider while seated on the seat, a wheel supporting the rear of the body, a handle bar in front of the seat and pivotally connected with the body and projecting upwardly thereof and comprising a handle portion disposed in front of the rider, means disposed below the body to effect driving of said rear wheel by oscillatory movement of the handle bar by the rider while seated upon the seat, a strip extending from each side of the forward portion of the body in simulation of an airplane wing, and means at the rear of the body simulating in form an airplane tail piece.

6. A wheeled toy vehicle of the class described comprising an elongated body, a horizontally arranged seat disposed medially thereon adapted to be straddled by the rider, said seat projecting laterally at either side of the body, a front axle pivotally connected with the body, means associated with said front axle adapted to form foot rests for the feet of a child seated upon the seat, a pair of front wheels carried thereby, a wheel supporting the rear of the body, a handle bar in front of the seat and pivotally connected with the body by an intermediate portion of the bar, a lower portion projecting below the body, an upper portion provided with a handle projecting above the body, means including said lower handle bar portion to effect driving of said rear wheel by oscillatory movement of the handle bar, a strip extending from each side of the body in simulation of an airplane wing, and means at the rear of the body simulating in form an airplane tail piece.

In testimony whereof, I hereunto affix my signature this 28th day of April, 1928.

DORMAN SCHAEFFER.